(12) United States Patent
Lee

(10) Patent No.: US 7,581,669 B2
(45) Date of Patent: Sep. 1, 2009

(54) TOOL FOR DIFFUSION BONDING OF MULTI SHEET METAL, METHOD OF MANUFACTURING STRUCTURAL PART USING THE SAME, AND STRUCTURAL PART MANUFACTURED USING THE METHOD

(75) Inventor: Ho Sung Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 77 days.

(21) Appl. No.: 11/917,402

(22) PCT Filed: Jul. 21, 2006

(86) PCT No.: PCT/KR2006/002891

§ 371 (c)(1), (2), (4) Date: Dec. 13, 2007

(87) PCT Pub. No.: WO2007/013750

PCT Pub. Date: Feb. 1, 2007

(65) Prior Publication Data

US 2008/0217385 A1 Sep. 11, 2008

(30) Foreign Application Priority Data

Jul. 25, 2005 (KR) ............. 10-2005-0067506

(51) Int. Cl.
*B23K 20/02* (2006.01)
*B23K 37/00* (2006.01)

(52) U.S. Cl. ............. 228/193; 228/4.1; 228/6.1; 228/44.3; 228/49.4

(58) Field of Classification Search .......... None
See application file for complete search history.

(56) References Cited

U.S. PATENT DOCUMENTS

| 4,349,333 A | * | 9/1982 | Bowles ............. 432/205 |
| 4,448,747 A | * | 5/1984 | Moritoki et al. ......... 419/49 |
| 4,509,179 A | * | 4/1985 | Zimmerman ............ 373/109 |
| 4,629,412 A | * | 12/1986 | Inoue et al. ........... 425/405.2 |

(Continued)

FOREIGN PATENT DOCUMENTS

JP        54125152        9/1979

(Continued)

OTHER PUBLICATIONS

Derwent (1985-103862) SU 1117167A.*

(Continued)

*Primary Examiner*—Kiley Stoner
(74) *Attorney, Agent, or Firm*—Rabin & Berdo, PC

(57) ABSTRACT

A method of manufacturing a structural part through diffusion bonding in solid state without secondary materials after stacking multi-sheet metal and a tool thereof are disclosed. The tool for diffusion boding of multi-sheet metal includes a top tool having a top gas inlet, a central tool coupled to the top tool for installing the multi-sheet metal inside the central tool, a bottom tool coupled to the central tool for supporting the multi-sheet metal and having a bottom gas inlet and a vacuum path for making a vacuum state or an inert gas environment, and a sealing plate interposed between the top tool and the central tool.

15 Claims, 2 Drawing Sheets

U.S. PATENT DOCUMENTS

| | | | |
|---|---|---|---|
| 4,756,680 A * | 7/1988 | Ishii | 425/78 |
| 5,193,737 A * | 3/1993 | Carraher | 228/157 |
| 6,733,592 B2 * | 5/2004 | Fujikawa et al. | 118/715 |
| 6,820,797 B2 * | 11/2004 | Clifford | 228/246 |
| 7,008,210 B2 * | 3/2006 | Manabe et al. | 425/185 |
| 7,353,982 B2 * | 4/2008 | Li | 228/193 |
| 2005/0109821 A1 * | 5/2005 | Li | 228/219 |

FOREIGN PATENT DOCUMENTS

| | | |
|---|---|---|
| JP | 55130388 | 10/1980 |
| JP | 62034687 | 2/1987 |
| JP | 2000334575 | 12/2000 |

OTHER PUBLICATIONS

Derwent (2007-759135) KR 654410B1.*

* cited by examiner

[Fig. 1]
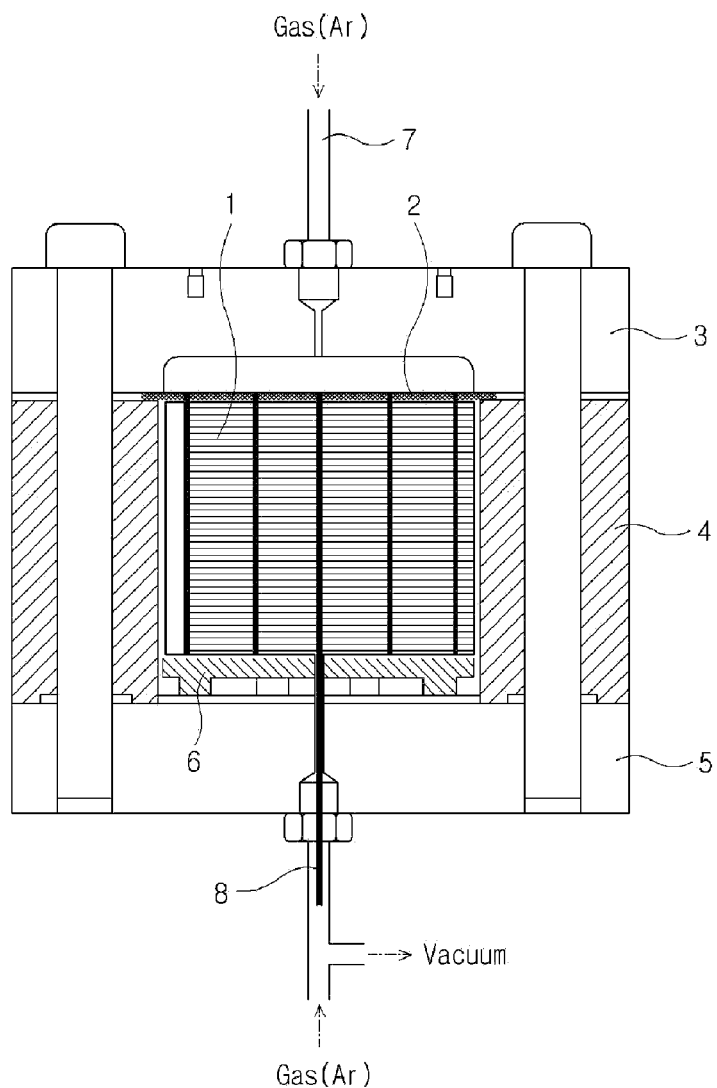
[Fig. 2]
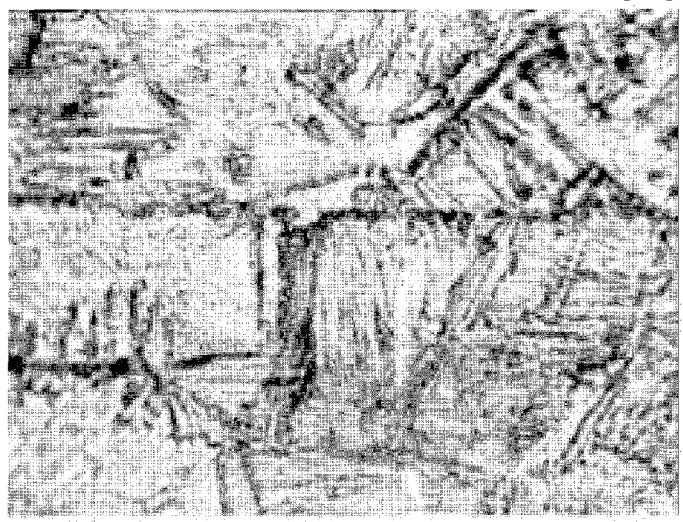

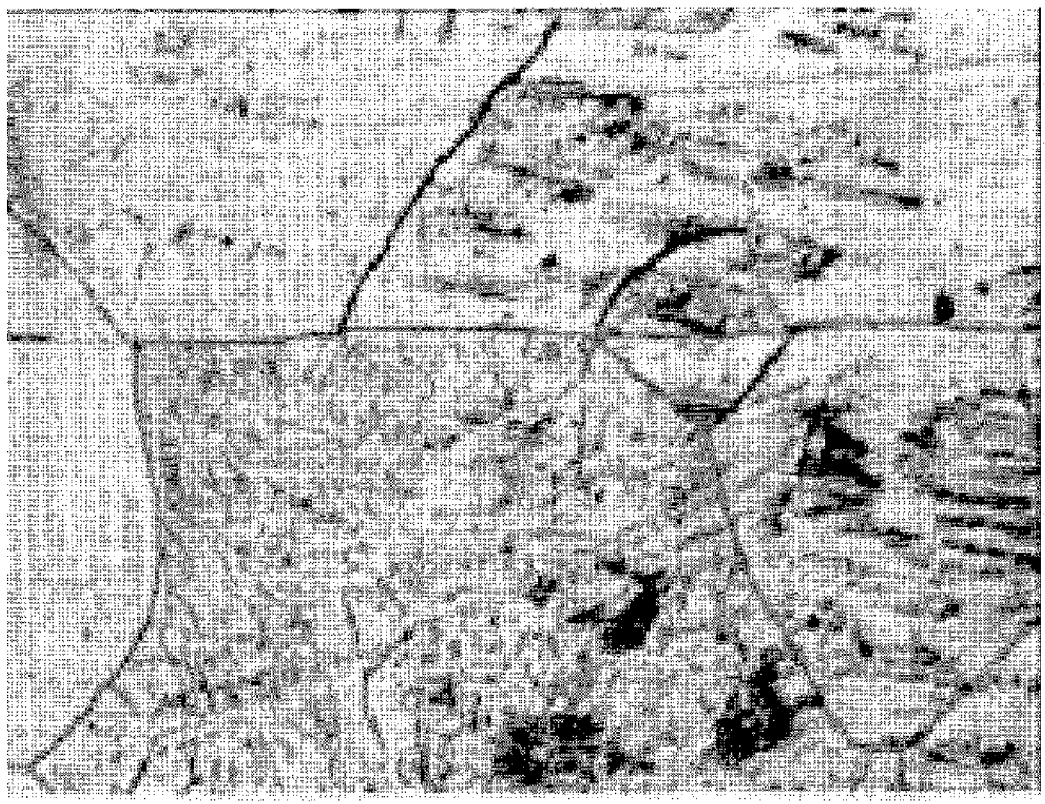
[Fig. 3]

TOOL FOR DIFFUSION BONDING OF MULTI SHEET METAL, METHOD OF MANUFACTURING STRUCTURAL PART USING THE SAME, AND STRUCTURAL PART MANUFACTURED USING THE METHOD

TECHNICAL FIELD

The present invention relates to a method of bonding structural parts; and, more particularly, to a method of manufacturing a structural part through diffusion bonding in solid state without secondary materials after stacking multi-sheet metal, and a tool thereof.

BACKGROUND ART

Generally, heat resistant alloy such as superalloy and titanium have been widely used in various technical fields, for example, military or commercial airplanes, projectiles, liquid rocket engines, automobiles, power generators, medical equipment and petrochemical plant. However, it is very difficult to mechanically process such a heat resistant alloy, for example, cutting, forging, rolling, and extruding. Furthermore, it is also difficult to cast the heat resistant alloy due to the high melting point thereof which is much higher than typical metal. For example, the cutting operation of the heat resistant alloy is very difficult and expense process. A cutting tool is easily damaged if it is used to cut the heat resistant alloy. Therefore, the life time of the cutting tool is seriously reduced after cutting the heat resistant alloy. Also, the metal removal rate thereof is very low. Therefore, the heat resistant alloy is generally cut through a waterjet machine or an electric discharge machine (EDM). After cutting the heat resistant alloy, some post processes are required. While performing the post processes, a great amount of heat resistant alloy is wasted.

In order to overcome such problems for mechanically processing the heat resistant alloy, a processing method using superplastic characteristics shown in a specific condition was introduced. However, the application fields of the processing method using the superplastic characteristics are limited to process a thin sheet metal (thin sheet diffusion bonding). Therefore, there is a demand for a new method for manufacturing a thick complicate shaped structural part made of heat resistant alloy with minimum mechanical processes and minimum post-processes (massive diffusion bonding).

The present invention relates to a method of manufacturing a complicate shaped structural part through diffusion bonding in solid state without using secondary materials after stacking multi-sheet metal. As a related art, a brazing method and a transited liquid phase diffusion bonding method were generally utilized. The brazing method is a method of bonding two materials. In the brazing method, an alloy having a comparatively lower melting point is interposed between target alloys to bond, and a predetermined heat is applied to melt the interposed alloy without melting the target alloys so as to bond the target alloys each other. The transient liquid phase diffusion bonding method uses a diffusion bonding method as well as the brazing method. In the transient liquid phase diffusion bonding method, a liquid phase is temporally formed after brazing, and diffusion bonding is made while sustaining a coupling temperature so as to form isothermal solidification to bond target alloys.

However, these conventional bonding methods use the secondary materials and the activator materials in the middle of bonding interfaces. Furthermore, since the liquid phase is formed in the middle of bonding process, the physical characteristics of the bonding surface may differ from that of the work piece. So, the mechanical strength is deteriorated.

DISCLOSURE OF INVENTION

Technical Problem

It is, therefore, an object of the present invention to provide a method of manufacturing a near net shaped structural part through diffusion bonding in solid state without using secondary materials after stacking pre-processed thin sheet metals in order to manufacture a complicate shaped structural part.

The manufacturing method according to the present invention is distinguished from a conventional brazing method and a conventional transient liquid phase diffusion bonding method. Since the manufacturing method dose not use secondary materials, the manufacturing method provides a high structural strength and increases the precision, reliability and durability of a bonding part. The manufacturing method according to the present invention uses a minimum preprocessed material and requires a simple post-process for correcting a process difference. Therefore, the manufacturing method according to the present invention reduces the manufacturing cost and the cost for raw-material.

Technical Solution

In accordance with an aspect of the present invention, there is provided a tool for diffusion boding of multi-sheet metal including: a top tool having a top gas inlet; a central tool coupled to the top tool for installing the multi-sheet metal inside the central tool; a bottom tool coupled to the central tool for supporting the multi-sheet metal and having a bottom gas inlet and a vacuum path for making a vacuum state; and a sealing plate interposed between the top tool and the central tool.

In accordance with another aspect of the present invention, there is provided a tool for diffusion bonding of multi-sheet metal including: a press for pressurizing; a central tool coupled to the pressurizing press for installing the multi-sheet metal inside the central tool; a bottom tool coupled to the central tool for supporting the multi-sheet metal; and a sealing plate interposed between the press and the central tool.

The tool may further include an insert interposed between the multi-sheet metal and the bottom tool.

In accordance with still another aspect of the present invention, there is provided a method of manufacturing a structural part using a tool for diffusion bonding of multi-sheet metal including a top tool having a top gas inlet; a central tool coupled to the top tool for installing the multi-sheet metal inside the central tool; a bottom tool coupled to the central tool for supporting the multi-sheet metal and having a bottom gas inlet and a vacuum path for making a vacuum state; and a sealing plate interposed between the top tool and the central tool, the method including: removing air from the tool to make the inside thereof in a vacuum state and injecting an inert gas using the top gas inlet and the bottom gas inlet; heating the tool with the gas injected until a temperature of the tool reaches a predetermined target temperature; injecting an inert gas with a pre-determined pressure through the top gas inlet when the temperature of the tool reaches the predetermined target temperature; and depressurizing the tool and cooling the tool down to an normal temperature after sustaining the pressure made by injecting the gas for a predetermined time.

In accordance with further still another aspect of the present invention, there is provided a method of manufacturing a structural part using a tool for diffusion bonding of multi-sheet metal including a press for pressurizing; a central tool coupled to the pressurizing press for installing the multi-sheet metal inside the central tool; a bottom tool coupled to the central tool for supporting the multi-sheet metal; and a sealing plate interposed between the press and the central tool, the method including: removing air from the tool to make the inside thereof in a vacuum state and injecting an inert gas; heating the tool with the gas injected until the temperature of the tool reaches a pre-determined target temperature; pressurizing the press with a predetermined pressure after the temperature of the tool reaches the predetermined temperature; and depressurizing and cooling the tool down to an normal temperature after sustaining the pressure made by the press for a predetermined time.

In the injecting of the inert gas, the air may be removed to make a vacuum state of about $10^{-4}$ Torr.

The tool with the gas inserted may be substantially heated until the temperature of the tool reaches a predetermined target temperature higher than the half of melting point of the multi-sheet metal.

The multi-sheet metal may be one selected from the group consisting of titanium alloy, steel material, copper alloy and superalloy, and the heating temperature may be higher than 700° C.

The predetermined pressure may be about 20 to 40 Bar.

The pressure may be sustained for about 30 minutes to 2 hours.

In accordance with yet further still another aspect of the present invention, there is provided a structural part manufactured by a method of manufacturing a structural part using a tool for diffusion bonding of multi-sheet metal.

ADVANTAGEOUS EFFECTS

As described above, the manufacturing method according to the present invention stacks a plurality of thin metal sheets and bonding them through diffusion bonding in solid state for manufacturing a complicate shaped structural part.

The manufacturing method according to the present invention uses a minimum pre-processed material and requires a simple post-process for correcting a process difference. Therefore, the manufacturing method according to the present invention reduces the manufacturing cost and the cost for raw-material.

The manufacturing method according to the present invention is distinguished from a conventional brazing method and a conventional transient liquid phase diffusion bonding method. Since the manufacturing method dose not use secondary materials, the manufacturing method provides a high structural strength and increases the precision, reliability and durability of a bonding part. Also, the manufacturing method according to the present invention less wastes raw material through near net shape so the economic benefit is provided. That is, the manufacturing method according to the present invention is distinguished from the conventional brazing method or the transient liquid phase diffusion bonding method in a view of a technology manufacturing a structural part by stacking a plurality of metal sheets and bonding them by atomic diffusion in a solid state. Also, the manufacturing method according to the present invention provides uniform contact pressure because the manufacturing method according to the present invention can use not only mechanical pressure made by a high temperature press or a hot roller but also a gas pressure.

BRIEF DESCRIPTION OF THE DRAWINGS

The above and other features and advantages of the present invention will become more apparent by describing in detail exemplary embodiments thereof with reference to the attached drawings in which:

FIG. 1 is a cross-sectional view of a tool for diffusion bonding of multi-sheet metal according to an embodiment of the present invention;

FIG. 2 is a picture showing diffusion bonding integrity of structural part manufacturing by a manufacturing method according to an first embodiment of the present invention; and FIG. 3 is a picture showing diffusion bonding integrity of structural part manufacturing by a manufacturing method according to a second embodiment of the present invention.

BEST MODE FOR CARRYING OUT THE INVENTION

Hereinafter, a method of manufacturing a structural part through diffusion bonding in solid state without secondary materials after stacking multi-sheet metal, and a tool thereof will be described in more detail with reference to the accompanying drawings.

FIG. 1 is a cross-sectional view of a tool for diffusion bonding of multi-sheet metal according to an embodiment of the present invention with a multi-sheet metal.

Referring to FIG. 1, a work piece 1 is multi-sheet metal formed of a plurality of thin metal sheets stacked as multiple layers. It is preferable to clean the surface of each metal sheet through chemical cleaning or mechanical grinding and to sustain them to be clean. The multi-sheet metal 1 is installed inside a tool according to the present embodiment, and the metal sheets are bonded one another.

As shown in FIG. 1, the tool according to the present embodiment includes a top tool 3, a central tool 4 and a bottom tool 5, which are firmly coupled one another thorough a coupling member. A sealing plate 2 is interposed between the top tool 3 and the central tool 4. The sealing plate 2 isolates the top tool 3 from the central tool 4 and the bottom tool 5 by sealing the central tool 4. Herein, FIG. 1 exemplary shows a tool using a gas pressure for manufacturing a diffusion bonding product. Therefore, the tool is required to sustain the sealing condition at high temperature and high pressure. On the contrary, if a tool uses a mechanical press for pressurizing, the tool includes a press instead of the top tool 3. That is, a method of pressurizing the multi-sheet metal according to the present invention includes a method using a mechanical press and a method using a high temperature gas as shown in FIG. 1.

Meanwhile, the top tool 3 and the bottom tool 5 includes a top gas inlet 7 and a bottom gas inlet 8, respectively, for injecting a gas for pressurizing, and an inlet communicated with the bottom gas inlet 8 includes a vacuum path for making the inside of the tool in a vacuum state.

An insert 6 may be interposed between a work piece 1 and the bottom tool 5. In the method of manufacturing a structural part through diffusion bonding of multi-sheet metal according to the present embodiment, a complicate shaped heat resistant structure may be manufactured by changing the shape of the insert 6. Therefore, the method of manufacturing a structural part using diffusion bonding of multi-sheet metal according to the present invention includes the manufacturing of a top tool 3 and a bottom tool for high temperature.

When the tools are completely assembled as shown in FIG. 1, air is removed from the tool to make the inside of the tool in a vacuum state about $10^{-4}$ Torr, and the inert gas is injected thereto using the top gas inlet 7 and the bottom gas inlet 8. After testing the air lock of the overall tool, the tool is inserted into a chamber and the chamber is heated with a predetermined heating temperature. In this case, the heating temperature is about a temperature higher than the half of the melting point of the multi-sheet metal. For example, it is preferable that the heating temperature is about 700° C. in case of superalloy such as titanium alloy. If the temperature reaches at the pre-determined target temperature, about 20 to 40 Bar of an inert gas is injected through the top gas inlet 7 when the press or the gas is used. Therefore, the inside of the top tool 3 is pressurized by the inert gas injected through the gas inlet 7. Meanwhile, it is preferable to sustain the pressure for about 30 minutes to about 2 hours. After the pressure is sustained for the predetermined time, the inside of the top tool 3 is depressurized and cooled down to a normal temperature.

The manufacturing method according to the present embodiment includes a diffusion bonding operation which is performed under a typical high temperature forming condition for bonding the multi-sheet metal. The high temperature forming condition may vary according to the type of raw material. The diffusion bonding according to the present embodiment is performed in a vacuum state or an oxidation resisting atmosphere at about 700 to 1300° C. with a pressure of maximum 50 Bar for 10 minutes as a loading time.

The tool according to the present embodiment of FIG. 1 has been particularly shown and described with reference to exemplary embodiments thereof. Therefore, the use of the present invention is not limited thereby, and the present invention may be applied to various part manufacturing environments for manufacturing structural parts by heating and pressurizing multi-sheet metal. That is, the uses of the present invention is not limited by FIG. 1, and it will be understood by those of ordinary skill in the art that various changes in form and details may be made therein without departing from the spirit and scope of the present invention as defined by the following claims.

Embodiment 1

The present embodiment relates a method of bonding structural parts using the high pressurized gas as a method for pressurizing multi-sheet metal.

At first, titanium alloy sheets, for example, Ti-6Al-4V sheets having a thickness of 2.04 mm, are cut along a desired shape, and the surface thereof are chemically cleaned. Then, 50 sheets of the titanium alloy are sequentially stacked in the tool according to the present embodiment. After stacking, the tool is sealed. Then, the air is removed from the top tool and the bottom tool using a vacuum pump.

Then, the tool is heated to reach about 800° C., and a less than 40 Bar of argon gas is injected to the top tool. When the temperature reaches a target temperature, for example, about 875° C., the 40 Bar of pressure is sustained for about 30 minutes. Then, the gas pressure is depressurized, and the tool is slowly cooled down by reducing the temperature thereof.

Meanwhile, it is important to sustain the vacuum state and the inert gas atmosphere of the bottom tool throughout the all manufacturing processes.

FIG. 2 shows the final shape of the structural part manufactured according to the present embodiment. As shown in FIG. 2, micro cracks or micro porosities are not shown at the diffusion bonded interface. That is, the perfect diffusion bonding is made by atomic diffusion and migration of grain boundaries in a solid state by massive diffusion bonding process.

Embodiment 2

The present embodiment relates to a method of bonding structural parts using a mechanical press as a method of pressurizing multi-sheet metal.

At first, titanium alloy sheets, for example, Ti-15Al-3-3 sheet having 3.00 mm of thickness, is cut. Then, the surface thereof is cleaned through mechanically grinding. After cleaning, 11 sheets of titanium alloy are stacked in the tool according to the present invention. The tool is heated with an argon gas atmosphere until the temperature thereof reaches about 800° C. Then, the temperature of the tool further increases to about 900° C. by applying about 60 Kg/mm$^2$ of pressure through the press.

After the target temperature 900° C. is sustained for about one hour, the temperature is reduced and the pressure is depressurized.

FIG. 3 shows the microstructure of the bonding structure manufactured according to the present embodiment. As shown in FIG. 3, the cracks are not shown at the bonding surface, new grain boundaries are grown, and the perfect diffusion bonding is made.

Meanwhile, the present embodiment shows that the perfect massive diffusion bonding can be made only by the flow of an inert gas without perfectly sealing the tool due to the instability of the oxidation layer at a high temperature.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A tool for diffusion bonding of multi-sheet metal comprising:
    a top tool having a top gas inlet; a central tool coupled to the top tool for installing the multi-sheet metal inside the central tool;
    a bottom tool coupled to the central tool for supporting the multi-sheet metal and having a bottom gas inlet and a vacuum path for making a vacuum state; and
    a sealing plate interposed between the top tool and the central tool.

2. A tool for diffusion bonding of multi-sheet metal comprising:
    a press for pressurizing;
    a central tool coupled to the pressurizing press for installing the multi-sheet metal inside the central tool;
    a bottom tool coupled to the central tool for supporting the multi-sheet metal and having a bottom gas inlet and a vacuum path for making a vacuum state; and
    a sealing plate interposed between the press and the central tool.

3. The tool of claim 2, further comprising an insert interposed between the multi-sheet metal and bottom tools.

4. A method of manufacturing a structural part using a tool for diffusion bonding of multi-sheet metal including a top tool having a top gas inlet;
    a central tool coupled to the top tool for installing the multi-sheet metal inside the central tool;
    a bottom tool coupled to the central tool for supporting the multi-sheet metal and having a bottom gas inlet and a vacuum path for making a vacuum state; and
    a sealing plate interposed between the top tool and the central tool, the method comprising:

removing air from the tool to make the inside thereof in a vacuum state and injecting an inert gas using the top gas inlet and the bottom gas inlet;

heating the tool with the gas injected until a temperature of the tool reaches a predetermined target temperature;

injecting an inert gas with a predetermined pressure through the top gas inlet when the temperature of the tool reaches the predetermined target temperature; and depressurizing the tool and cooling the tool down to an normal temperature after sustaining the pressure made by injecting the gas for a predetermined time.

5. A method of manufacturing a structural part using a tool for diffusion bonding of multi-sheet metal including a press for pressurizing; a central tool coupled to the pressurizing press for installing the multi-sheet metal inside the central tool; a bottom tool coupled to the central tool for supporting the multi-sheet metal and having a bottom gas inlet and a vacuum path for making a vacuum state; and a sealing plate interposed between the press and the central tool, the method comprising:

removing air from the tool to make the inside thereof in a vacuum state and injecting an inert gas;

heating the tool with the gas injected until the temperature of the tool reaches a predetermined target temperature;

pressurizing the press with a predetermined pressure after the temperature of the tool reaches the predetermined temperature; and depressurizing and cooling the tool down to an normal temperature after sustaining the pressure made by the press for a predetermined time.

6. The method of claim 5, wherein in the injecting of the inert gas, the air is removed to make a vacuum state of about 10 Torr.

7. The method of claim 5, wherein the tool with the gas inserted is substantially heated until the temperature of the tool reaches a predetermined target temperature higher than the half of melting point of the multi-sheet metal.

8. The method of claim 7, wherein the multi-sheet metal is one selected from the group consisting of titanium alloy, and superalloy, and the heating temperature is higher than 700 <0>C.

9. The method of claim 5, wherein the predetermined pressure is about 20 to 40 Bar.

10. The method of claim 5, wherein the pressure is sustained for about 30 minutes to 2 hours.

11. The tool of claim 1, further comprising an insert interposed between the multi-sheet metal and bottom tools.

12. The method of claim 4, wherein in the injecting of the inert gas, the air is removed to make a vacuum state of about 10 Torr.

13. The method of claim 4, wherein the tool with the gas inserted is substantially heated until the temperature of the tool reaches a predetermined target temperature higher than the half of melting point of the multi-sheet metal.

14. The method of claim 4, wherein the predetermined pressure is about 20 to 40 Bar.

15. The method of claim 4, wherein the pressure is sustained for about 30 minutes to 2 hours.

* * * * *